United States Patent [19]

Soulard

[11] Patent Number: 4,568,372

[45] Date of Patent: Feb. 4, 1986

[54] BURNERS FITTING OUT MACHINES DESIGNED FOR THE THERMOMECHANICAL TREATMENT OF ARTICLES SUCH AS, MORE PARTICULARLY, GLASS TUBES

[75] Inventor: Dominique Soulard, Gauville, France

[73] Assignee: Societe Francaise d'Ampoules Mecaniques, Aumale, France

[21] Appl. No.: 636,663

[22] Filed: Aug. 1, 1984

[30] Foreign Application Priority Data

Aug. 1, 1983 [FR] France .............................. 83 12628

[51] Int. Cl.⁴ ............................................ C03B 23/11
[52] U.S. Cl. ........................................ 65/270; 65/65;
65/113; 65/120; 65/271; 65/284
[58] Field of Search ..................... 65/108, 113, 36, 40,
65/120, 270, 271, 284, 65, 252

[56] References Cited

U.S. PATENT DOCUMENTS 794,755  7/1905  Uhlig ..................................... 65/284
3,510,287  5/1970  Panczner ............................. 65/284

FOREIGN PATENT DOCUMENTS 593564  3/1960  Canada ................................. 65/284

Primary Examiner—Arthur Kellogg
Attorney, Agent, or Firm—Wenderoth, Lind & Ponack

[57] ABSTRACT

A burner for a machine for the thermomechanical treatment of glass tubes is oriented obliquely with respect to a path of movement followed by the glass tubes in the machine. The burner is connected to a fuel delivery pipe and is provided with nozzles arranged in tiers in the desired direction.

5 Claims, 1 Drawing Figure

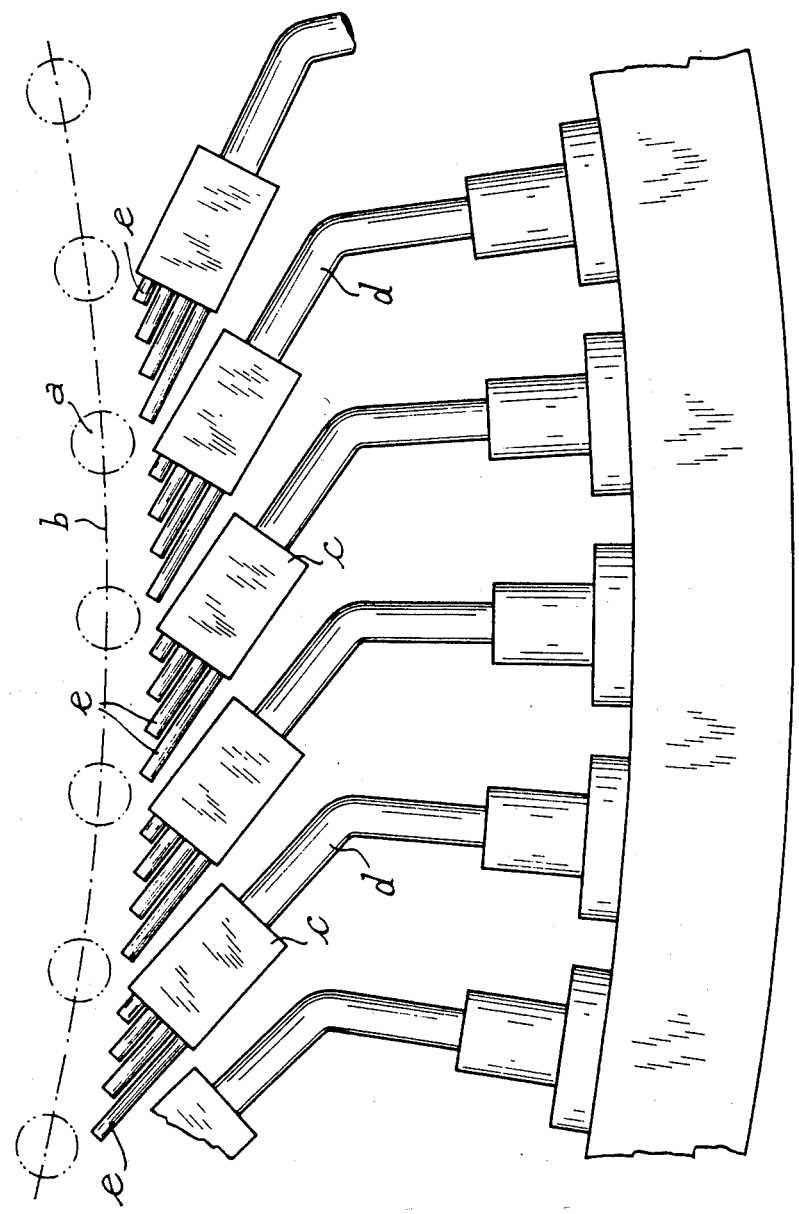

BURNERS FITTING OUT MACHINES DESIGNED FOR THE THERMOMECHANICAL TREATMENT OF ARTICLES SUCH AS, MORE PARTICULARLY, GLASS TUBES

BACKGROUND OF THE INVENTION

The present invention relates to burners employed in machines designed for the thermomechanical treatment of articles such as glass tubes.

The invention is intended to be applied more particularly, but not exclusively, to burners employed in machines used for forming pharmaceutical vials from glass tubes.

In this type of machine, tubes placed on a rotary conveyor either move past sliding or follower blowpipes, or past a ring of burners coaxial to the conveyor. In prior art machines of the last-mentioned type, the flames of the burners are directed perpendicularly to the path followed by the tubes.

SUMMARY OF THE INVENTION

According to the invention, in order to reduce the number of burners, the latter are oriented obliquely with respect to such path.

According to one embodiment of the invention, the burners inclined with respect to the path are provided with nozzles arranged in tiers.

BRIEF DESCRIPTION OF THE DRAWING

An embodiment of the invention now will be described by way of illustrative example with reference to the accompanying single drawing.

DETAILED DESCRIPTION OF THE INVENTION

A machine according to the invention provides a thermomechanical treatment of glass tubes a to impart thereto a shape such that they may be used as vials containing pharmaceutical products.

Tubes a are moved by a rotary conveyor along a curved path b during which they move past a ring of burners such as c which emit flames which make it possible to perform at a desired location of each tube a thermomechanical treatment required for the formation of a vial.

According to the invention, the flames of the burners, instead of being directed as in prior art machines perpendicularly to the path followed by the tubes, is directed obliquely with respect to such path.

In the illustrated embodiment, a pipe d delivering fuel to a respective burner c is bent to incline the burner with respect to the path b, as taught by the invention. Each burner is provided with nozzles e arranged in tiers in the direction of its inclination with respect to the path b.

Due to this arrangement according to the invention, all other factors being equal, the heating zone of each tube is increased considerably, so that the number of burners can be reduced.

The burner, instead of being rectangular as in the illustrated embodiment, can have a trapezoidal shape, the large side of the trapezoid being directed in the direction of progression of the tubes, in which case the nozzles e are replaced by simple holes made in the burner.

The burner may also consist of a continuous ring whose nozzles are oriented obliquely in relation to the path b.

The invention lends itself readily to other embodiments without departing from the spirit of the invention.

I claim:

1. An apparatus for subjecting a plurality of glass tubes to a heat treatment, said apparatus comprising:
   rotary conveyor means for moving a plurality of glass tubes along a curved path while maintaining the glass tubes oriented with the axes thereof extending transverse to said curved path; and
   stationary burner means, positioned laterally of said tubes and outwardly of said curved path, for directing flames toward sides of said tubes in directions obliquely of said curved path.

2. An apparatus as claimed in claim 1, wherein said burner means includes at least one burner connected to a fuel delivery line shaped to orient said burner obliquely of said curved path.

3. An apparatus as claimed in claim 1, wherein said burner means comprises at least one burner having a plurality of nozzles arranged in a tier in said oblique directions.

4. An apparatus as claimed in claim 1, wherein said burner means comprises a trapezoid-shaped burner having a large side having burner openings directed in said oblique directions.

5. An apparatus as claimed in claim 1, wherein said burner means comprise a ring of burners surrounding said curved path.

* * * * *